US008935663B2

(12) United States Patent
Tiwari

(10) Patent No.: US 8,935,663 B2
(45) Date of Patent: Jan. 13, 2015

(54) IDENTIFYING DEPRECATED EXTERNAL ROUTINES INVOKED BY A SOFTWARE APPLICATION IMPLEMENTING SUBTYPE POLYMORPHISM

(75) Inventor: Praneet Tiwari, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 250 days.

(21) Appl. No.: 13/426,605

(22) Filed: Mar. 22, 2012

(65) Prior Publication Data

US 2013/0254745 A1 Sep. 26, 2013

(51) Int. Cl.
*G06F 9/44* (2006.01)

(52) U.S. Cl.
USPC ............ 717/116; 717/106; 717/108; 717/114

(58) Field of Classification Search
CPC ..... G06F 9/443; G06F 9/4433; G06F 9/4428; G06F 8/315; G06F 9/548
See application file for complete search history.

(56) References Cited

U.S. PATENT DOCUMENTS

| 6,014,518 | A  | * | 1/2000  | Steensgaard | 717/154 |
|-----------|----|---|---------|-------------|---------|
| 6,754,887 | B1 | * | 6/2004  | Gil et al. | 717/116 |
| 6,836,879 | B1 | * | 12/2004 | Myers | 717/116 |
| 7,496,892 | B2 | * | 2/2009  | Nuss | 717/114 |
| 2002/0152457 | A1 | * | 10/2002 | Jahnke | 717/139 |
| 2003/0167456 | A1 | * | 9/2003 | Sabharwal | 717/108 |
| 2003/0191864 | A1 | * | 10/2003 | Govindarajapuram et al. | 709/310 |
| 2005/0097514 | A1 | * | 5/2005 | Nuss | 717/114 |
| 2008/0295070 | A1 | * | 11/2008 | Bozza et al. | 717/106 |
| 2009/0031285 | A1 | * | 1/2009 | Agrawal | 717/116 |
| 2009/0138847 | A1 | * | 5/2009 | Beckwith et al. | 717/108 |
| 2010/0223595 | A1 | * | 9/2010 | Mateescu et al. | 717/107 |
| 2011/0153559 | A1 | * | 6/2011 | Rangarajan et al. | 707/609 |
| 2013/0055211 | A1 | * | 2/2013 | Fosback et al. | 717/126 |

OTHER PUBLICATIONS

Ivor Horton; Beginning Visual C++ 2008, 2008 Wiley Publishing Inc.; 41 pages; US Patent and Trade Mark Office library.*
Joseph Gil et al.; Environment al Acquisition A New Inheritance-Like Abstraction Mechanism; 1996 ACM; pp. 214-231; <http://dl.acm.org/citation.cfm?id=236358>.*
Sanchit Bansal; Multiple Polymorphic Arguments in Single Dispatch Object Oriented Languages; 2009 IBM-IRL; pp. 260-271; <http://link.springer.com/chapter/10.1007/978-3-642-14825-5_23>.*
D Powers; Why object-oriented PHP; 2008 Springer; pp. 3-20; <http://link.springer.com/chapter/10.1007/978-1-4302-1012-2_1>.*

(Continued)

*Primary Examiner* — Thuy Dao
*Assistant Examiner* — Cuong V Luu
(74) *Attorney, Agent, or Firm* — Narendra Reddy Thappeta

(57) ABSTRACT

An aspect of the present invention identifies deprecated routines invoked by a software application implementing subtype polymorphism by examination of the software application, without having to execute the software instructions. In one embodiment, upon receiving software instructions constituting the software application, the polymorphic data types, variables of the data types, and a corresponding set of assignments for each variable are identified in the received software instructions. The specific instructions containing invocations of routines associated with the identified variables are also found. In response to finding the invocations, the routines that are invoked corresponding to the specific instructions are determined. The specific (determined) routines that are deprecated are ascertained and a report is thereafter generated indicating the specific routines.

17 Claims, 12 Drawing Sheets

(56) References Cited

OTHER PUBLICATIONS

Andruid Kerne et al.; A Concise XML Binding Framework Facilitates Practical Object-Oriented Document Engineering; 2008 ACM; pp. 62-65; <http://dl.acm.org/citation.cfm?id=1410140.1410152&coll=DL&dl=GUIDE&CFID=588581480&CFTOKEN=77445800>.*

Jan Jonas et al.; Mining Framework Usage Changes from Instantiation Code; 2008 ACM; pp. 471-480; <http://dl.acm.org/citation.cfm?id=1368088.1368153&coll=DL&dl=GUIDE&CFID=588581480&CFTOKEN=77445800>.*

Jeffrey L. Overbey et al.; Regrowing a Language Refactoring Tools Allow Programming Languages to Evolve; 2009 ACM; pp. 493-502; <http://dl.acm.org/citation.cfm?id=1640089.1640127&coll=DL&dl=GUIDE&CFID=588581480&CFTOKEN=77445800>.*

Annotations "The JAVA™ Tutorials", http://docs.oracle.com/javase/tutorial/java/javaOO/annotations.html, downloaded circa Feb. 6, 2012, pp. 1-4.

Oracle Solaris Preflight Application Checker "Oracle" http://www.oracle.com/technetwork/server-storage/solaris11/downloads/preflight-checker-tool-524493.html, downloaded circa Feb. 6, 2012, pp. 1-2.

* cited by examiner

FIG. 3

```
01: #include <iostream>
02: #include <string>
03: using namespace std;
04: class Satellite {          ←315
05: private :
06:    int mass;
07: public :
08:    virtual int getMass() {   ←320
09:       return -1 ;
10:    }
11:    virtual string getName() {   ←325
12:       return "a Satellite." ;
13:    }
14: };
15: class Planet: public Satellite {   ←330
16: public :
17:    virtual void texturize() = 0;   ←335
18:    void drawASphere() {   ←337
19:       cout << "\t1.Drawing a sphere" << endl;
20:    }
21:    void render() {   ←340
22:       drawASphere();
23:       texturize();
24:    }
25: };
```

```
01: #include "planet.h"          ← 405
02: #include <iostream>
03: using namespace std;
04: class Jupiter : public Planet {     ← 410
05:   public :
06:     void texturize() {        ← 415
07:       drawTheRings();
08:     }
09:   private :
10:     void drawTheRings() {
11:       cout << "\t2.Drawing the rings on the stormy planet" << endl;
12:     }
13:   public :
14:     int getMass() {           ← 435
15:       return 1000 ;
16:     }
17:     string getName() {        ← 425
18:       return "Jupiter!" ;
19:     }
20: };
21: class Earth : public Planet {       ← 420
22:   public :
23:     void texturize() {        ← 440
24:       paintBlue();            ← 442
25:     }
26:     string getName() {        ← 445
27:       return "Earth!" ;
28:     }
29:   private :
30:     void paintBlue() {
31:       cout << "\t2.Painting the earth blue" << endl;
32:     }
33: };
```

```
01:  #include "planets.h"          ← 450
02:  #include <iostream>
03:  using namespace std;
04:  void another_set();
05:  int main() {
06:     Planet *p;                  ← 460
07:     Earth earth;                ← 461
08:     Jupiter jupiter;
09:     cout <<"\nWelcome to planet drawing routine" <<endl;
10:     cout <<"\nDrawing earth now:-" << endl;
11:     p = &earth;                 ← 465
12:     p->render();                ← 470
13:     earth.render();             ← 472
14:     cout <<"\nDrawing jupiter now:-" << endl;
15:     p = &jupiter;               ← 475
16:     p->render();                ← 478
17:     jupiter.render();           ← 479
18:     another_set();
19:     return 0;
20:  }
21:  void another_set() {           ← 480
22:     Satellite earth2;           ← 481
23:     cout <<"\n\nMass of earth is " << earth2.getMass()<<" " and I am " << earth2.getName() << endl;  ← 482
24:     Satellite* earth3 = new Earth();   ← 483
25:     cout <<"Mass of earth is " << earth3->getMass()<<" " and I am " << earth3->getName() << endl;  ← 484
26:     earth3 = &earth2;           ← 485
27:     cout <<"Mass of earth is " << earth3->getMass()<<" " and I am " << earth3->getName() << endl;  ← 486
28:     Jupiter jupiter;            ← 487
29:     Satellite* jupiter2 = &jupiter;    ← 488
30:     cout <<"\nMass of jupiter2 is " << jupiter2->getMass() <<" " and I am " << jupiter2->getName() << endl;  ← 489
31:     Satellite jupiter3;         ← 490
32:     cout <<"Mass of jupiter3 is " << jupiter3.getMass() <<" " and I am " <<jupiter3.getName() << endl;  ← 491
33:     Jupiter jupiter4;           ← 492
34:     cout <<"Mass of jupiter4 is " << jupiter4.getMass() <<" " and I am " <<jupiter4.getName() << endl;  ← 493
35:  }  ← 494
```

| Package Name 521 | Class Name 522 | Routine Name 523 | Severity 524 | Possible Fixes 525 | Suggestions 526 |
|---|---|---|---|---|---|
| libPlanet::std | Planet | drawASphere | Level 2: Deprecated but compatible in this release | Remove the usage of this method/function as alternatives are available | Redesign the application to avoid usage of this method/function |
| libPlanet::std | Satellite | getName | Level 3: Compatible with current and foreseeable releases, still the method/function should be avoided as a best practice. | Remove the usage of this method/function for compatibility with future releases | Redesign the application to avoid usage of this method/function |
| libPlanet::std | | findPlanet | Level 1: Totally incompatible | Remove the usage of this method | Redesign the application to avoid usage of this method/function |

541 → (row 1), 542 → (row 2), 543 → (row 3), 500

| Class Name | AncestorList | File Name | IsTemplate Class | Package Name | isRed | Subclassing Qualifiers | Variable List <var name, data type> |
|---|---|---|---|---|---|---|---|
| Satellite | <None> | planet.h | FALSE | libPlanet::std | TRUE | <none> | <mass, int.> |
| Planet | Satellite | planet.h | FALSE | libPlanet::std | TRUE | public | |
| Jupiter | Planet | planets.h | FALSE | libPlanet::std | FALSE | public | |
| Earth | Planet | planets.h | FALSE | libPlanet::std | FALSE | public | |

FIG. 6C

| Routine Name | #arguments | return type | File Name | Line Number |
|---|---|---|---|---|
| main | 0 | void | main.cpp | 5 |
| another_set | 0 | void | main.cpp | 21 |

| | Class Name | Routine Name | Virtual | #arguments | Implemetation Found | Qualifiers | Special | IsRed | Variable List <var name> |
|---|---|---|---|---|---|---|---|---|---|
| 651 → | Satellite | getMass | yes | 0 | TRUE | public | FALSE | FALSE | |
| 652 → | Satellite | getName | yes | 0 | TRUE | public | FALSE | TRUE | |
| 653 → | Planet | texturize | yes | 0 | FALSE | public | FALSE | FALSE | |
| 654 → | Planet | drawASphere | No | 0 | TRUE | public | FALSE | TRUE | |
| 655 → | Planet | render | No | 0 | TRUE | private | FALSE | FALSE | |
| 656 → | Jupiter | drawTheRings | No | 0 | TRUE | public | FALSE | FALSE | |
| 657 → | Jupiter | texturize | No | 0 | TRUE | public | FALSE | FALSE | |
| 658 → | Jupiter | getName | No | 0 | TRUE | public | FALSE | FALSE | |
| 659 → | Jupiter | getMass | No | 0 | TRUE | private | FALSE | FALSE | |
| 660 → | Earth | paintBlue | No | 0 | TRUE | public | FALSE | FALSE | |
| 661 → | Earth | texturize | No | 0 | TRUE | public | FALSE | FALSE | |
| 662 → | Earth | getName | No | 0 | TRUE | public | FALSE | FALSE | |

| Name | Scope | Type | Qualifiers | Assignment List <line#, resolved, Assigned type> |
|---|---|---|---|---|
| p | main.cpp:main | Planet* | | <11, true, Earth>, <15, true, Jupiter> |
| earth | main.cpp:main | Earth | | |
| jupiter | main.cpp:main | Jupiter | | |
| earth2 | main.cpp:another_set | Satellite | | |
| earth3 | main.cpp:another_set | Satellite* | | <24, true, Earth>, <26, true, Satellite> |
| jupiter | main.cpp:another_set | Jupiter | | |
| jupiter2 | main.cpp:another_set | Satellite* | | <29, true, Jupiter> |
| jupiter3 | main.cpp:another_set | Satellite | | |
| jupiter4 | main.cpp:another_set | Jupiter | | |

| Class Name | Routine Name | Virtual | #arguments | | IsRed | Variable List <var name> | CalledList <called, file, line#> |
|---|---|---|---|---|---|---|---|
| Satellite | getMass | yes | 0 | | FALSE | | |
| Satellite | getName | yes | 0 | | TRUE | | |
| Planet | texturize | yes | 0 | | FALSE | | |
| Planet | drawASphere | No | 0 | | TRUE | | |
| Planet | render | No | 0 | | FALSE | | <drawASphere,planet.h,23>, <texturize,planet.h,24> |
| Jupiter | drawTheRings | No | 0 | | FALSE | | |
| Jupiter | texturize | No | 0 | | FALSE | | <drawTheRings,planets.h,7> |
| Jupiter | getName | No | 0 | | FALSE | | |
| Jupiter | getMass | No | 0 | | FALSE | | |
| Earth | paintBlue | No | 0 | | FALSE | | |
| Earth | texturize | No | 0 | | FALSE | | <paintBlue,planets.h,24> |
| Earth | getName | No | 0 | | FALSE | | |

FIG. 7B

IDENTIFYING DEPRECATED EXTERNAL ROUTINES INVOKED BY A SOFTWARE APPLICATION IMPLEMENTING SUBTYPE POLYMORPHISM

BACKGROUND OF THE INVENTION

1. Technical Field

The present disclosure relates to compatibility checking of software applications, and more specifically to identifying deprecated external routines invoked by a software application implementing subtype polymorphism.

2. Related Art

A software application refers to a set of instructions, which when executed performs various tasks defined by a program logic underlying the instructions. The instructions are often first developed using high level programming languages such as C, C++, Java, etc., and then converted into machine executable binary code using compiler type utilities, as is well known in the relevant arts.

The instructions are grouped into routines and modules for convenience of development, software management, code reuse, etc., as is also well known in the relevant arts. Some of the routines and modules are provided external to a software application, typically in the form of libraries to facilitate sharing by multiple applications. Such externally provided routines and modules are invoked using corresponding respective pre-determined conventions, by software instructions of each software application.

Deprecated routines are often a concern in software applications. A routine is said to be deprecated if continued use of the routine is undesirable in software applications. Such undesirability is found, for example, when a later/subsequent version of a library does not support the routine. As another example, some of the implementations of a library for different development environments (e.g., GNU C vs. Visual Studio) may not provide support for a routine. Accordingly during migration of a software application to an implementation not supporting the routine, the routine is said to be deprecated.

It is therefore desirable that invocation of such deprecated routines be identified in a software application. Such identification facilitates developers to address issues presented by deprecation of corresponding external routines.

Challenges are presented in identification of invocation of deprecated routines when software applications implement subtype polymorphism. Polymorphism refers to a programming approach in which related, but different, programming functionalities are implemented associated with the same identifier. Subtype polymorphism refers to a specific form of polymorphism in which different data (sub)types (domain of values, e.g., integer, real, complex, custom-defined types, etc.) can be substituted for a super data type (e.g., number). The sub and super data types together are referred to as polymorphic data types.

The approach of subtype polymorphism facilitates programming constructs (e.g., routines) to be written to operate on elements of the super type, and to be thereafter used with any of the different subtypes as well. Thus, in a software application implementing subtype polymorphism, the (same) identifier of the super-type is used to represent different sub-types. An instruction specifying invocation of a routine associated with a variable of a polymorphic data type, may (during execution) cause invocation of a corresponding routine in any of the super-type or subtypes.

Several aspects of the present invention facilitate identification of deprecated external routines invoked by a software application implementing subtype polymorphism.

BRIEF DESCRIPTION OF THE DRAWINGS

Example embodiments of the present invention will be described with reference to the accompanying drawings briefly described below.

FIG. 3 depicts instructions of a library in an embodiment.

FIGS. 4A and 4B (together referred to as FIG. 4) together depict instructions of a software application in an embodiment.

FIG. 5 depicts portion of data used in identifying deprecated routines invoked in a software application in an embodiment.

FIGS. 6A-6C together depicts the output generated from a first pass of examination of instructions constituting the software application of FIG. 4 in one embodiment.

FIGS. 7A-7B together depicts the output generated from a second pass of examination of instructions constituting the software application of FIG. 4 in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

Figure 1:
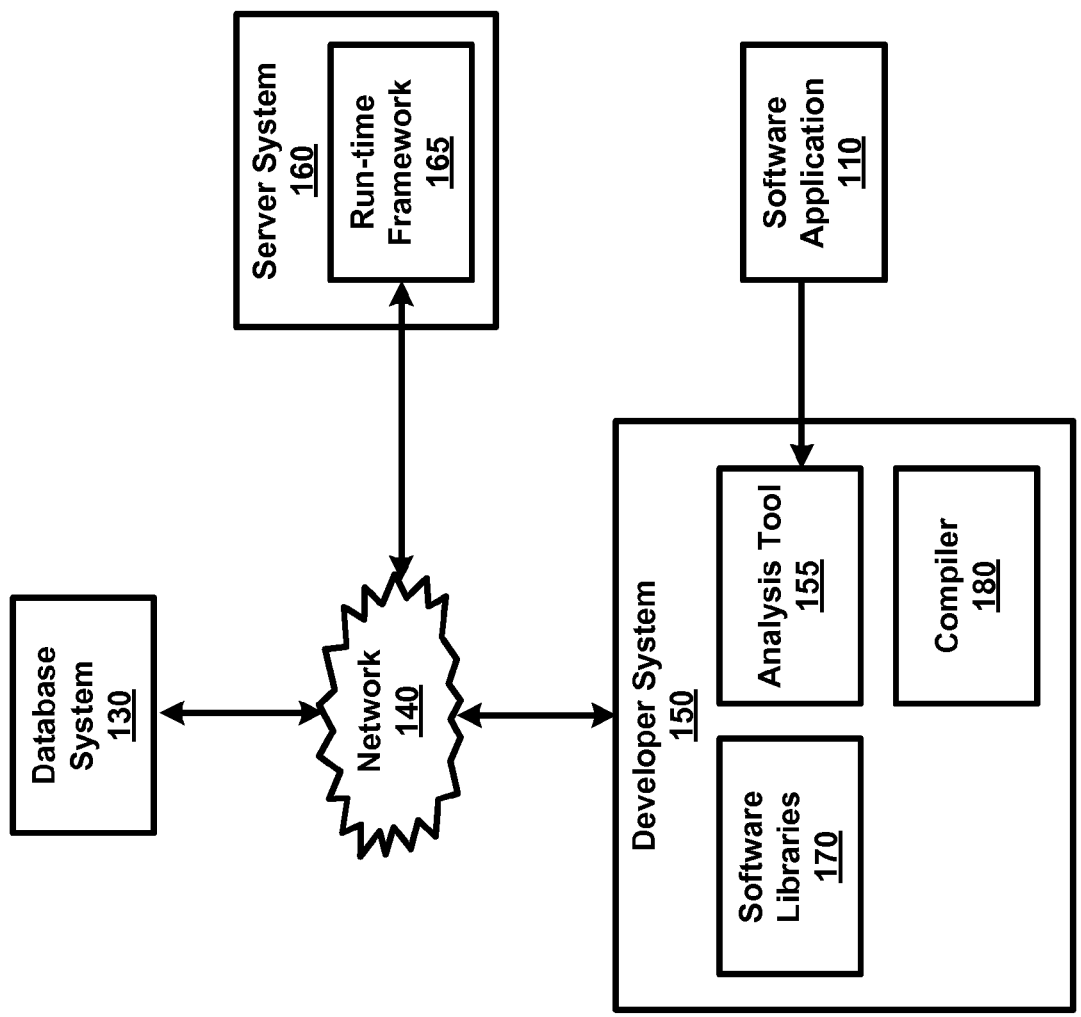
FIG. 1 is a block diagram illustrating an example environment in which several features of the present invention are implemented.

An aspect of the present invention identifies deprecated routines invoked by a software application implementing subtype polymorphism by examination of the software application, without having to execute the software instructions. In one embodiment, upon receiving software instructions constituting the software application, the polymorphic data types, variables of the data types, and a corresponding set of assignments for each variable are identified in the received software instructions. The specific instructions containing invocations of routines associated with the identified variables are also found. In response to finding the invocations, the routines that are invoked corresponding to the specific instructions are determined. The specific (determined) routines that are deprecated are ascertained and a report is thereafter generated indicating the specific routines.

According to another aspect, a database is maintained indicating the routines that are deprecated along with the corresponding severity, a corresponding set of possible fixes and a corresponding set of suggestions for each of the deprecated routines. The deprecated routines invoked by the software application is ascertained based on whether a routine determined to be invoked is contained in the database, with the existence of the routine indicate an invocation of a deprecated routine.

According to one more aspect, the determination of the specific routine (implementation) invoked corresponding to an instruction (indicating invocation of the routine associated with a variable) is performed based on the last assignment corresponding to the variable. In a scenario that the variable is determined to hold a value of a first data type (based on the last assignment) prior to the instruction (that is, invocation of the routine) and the first data type contains an implementation of the routine, the implementation is determined to be the specific routine that is invoked corresponding to the instruction. Alternatively, if an implementation of the routine is not found in the first data type, a set of data types that are ancestors to the first data type are searched and an implementation for the routine in a second data type is determined to be the specific routine that is invoked.

According to yet another aspect of the present invention, the actions of identifying and finding are performed during multiple passes, each pass representing an (independent) examination of the software instructions. In particular, the identifying of the polymorphic data types is performed during a first pass, the identifying of the variables and corresponding set of assignments is performed during a second pass, and the finding of instructions containing invocations of a routine on an identified variable is performed during a third pass. In one embodiment, when the software instructions constituting the software application are specified according to a programming language, the actions of identifying and finding are performed according to the syntax and semantics of the programming language.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

FIG. 1 is a block diagram illustrating an example environment in which several aspects of the present invention can be implemented. The diagram is shown containing software application 110, database system 130, network 140, developer system 150 and server system 160. Merely for illustration, only representative number/type of devices and systems are shown in FIG. 1. Many environments often contain many more systems, both in number and type, depending on the purpose for which the environment is designed. Each block of FIG. 1 is described below in further detail.

Network 140 provides connectivity between developer system 150, database system 130 and server system 160. Network 140 may be implemented using protocols such as Transmission Control Protocol (TCP) and/or Internet Protocol (IP), well known in the relevant arts. In general, in TCP/IP environments, an IP packet is used as a basic unit of transport, with the source address being set to the IP address assigned to the source system from which the packet originates and the destination address set to the IP address of the target system to which the packet is to be eventually delivered. A (IP) packet is said to be directed to a target system when the destination IP address of the packet is set to the (IP) address of the target system, such that the packet is eventually delivered to the target system by network 140. When the packet contains content such as port numbers, which specifies the target application, the packet may be said to be directed to such application as well. Network 140 may be implemented using any combination of wire-based or wireless mediums.

Database system 130 contains a non-volatile (persistent) storage facilitating storage and retrieval of a collection of data. Database system 130 may be implemented as a corresponding database server using relational database technologies and accordingly provide for storage and retrieval of data uses structured queries such as SQL (Structured Query Language). Database system 130 may store various tables providing information required for identifying whether routines invoked by instructions of software applications are deprecated. Additional information such as possible fixes or suggestions for the deprecated routines (e.g., suggested alternative routines), and severity of problem in case of use of the deprecated routines, may also be stored in database system 130. In addition, database system 130 may store data used by software application 110 during execution in server system 160.

Developer system 150 represents a system such as a workstation, personal computer, etc., that facilitates developers to create software applications. Developer system 150 is shown containing software libraries 170, compiler 180 and analysis tool 155. Software libraries 170 represent a collection of various routines, data types, etc., that are shared among multiple software applications, and are accordingly provided external to such applications.

Compiler 180 converts the instructions (in the high level programming language) constituting each software application into low level code (either binary code that is executable in server system 160, or in other format amenable for execution by run-time framework 165). Software libraries 170 may also be compiled and bundled along with the compiled software application, for execution by run-time framework 165. Alternatively, the compiled libraries may be provided during execution of applications by run-time framework 165, thereby avoiding the need for bundling the compiled libraries with the compiled software applications.

Software application 110 contains software instructions (typically in a high level programming language), which when compiled and executed, causes a corresponding desired functionality to be provided to one or more users. Some of the software instructions define routines and some of the instructions invoke such routines or externally provided routines such as those in software libraries 170.

Server system 160 represents a system such as a web/application server that provides run-time framework 165, in which various compiled software applications are executed. As noted above, some of the software applications may implement subtype polymorphism. Run-time framework 165 may accordingly be implemented in conjunction with compiler 180 to support subtype polymorphism. For example, compiler 180 may identify and mark the specific invocations which are not resolved (i.e., where the specific routine to be invoked is not yet determined), with run-time framework 165 thereafter resolving such unresolved invocations. Such resolution is based on the execution state (e.g., the specific data type of the variable) of the application at the time the invoking instruction is executed.

It may accordingly be appreciated that the specific routine that is resolved and executed may be known only in the execution duration. Any error conditions (including unexpected failure of the software application) that could occur due to any of such routines being deprecated may be undesirable. Even if such error conditions do not occur, it may be undesirable that a developer is not made aware of such executed routines being deprecated during development of the software application.

Analysis tool 155 provided according to several aspects of the present invention examines the software instructions and determines whether any external routines invoked in the software instructions due to subtype polymorphism, are deprecated.

3. Identifying Deprecated Dynamically Bound Routines

Figure 2:
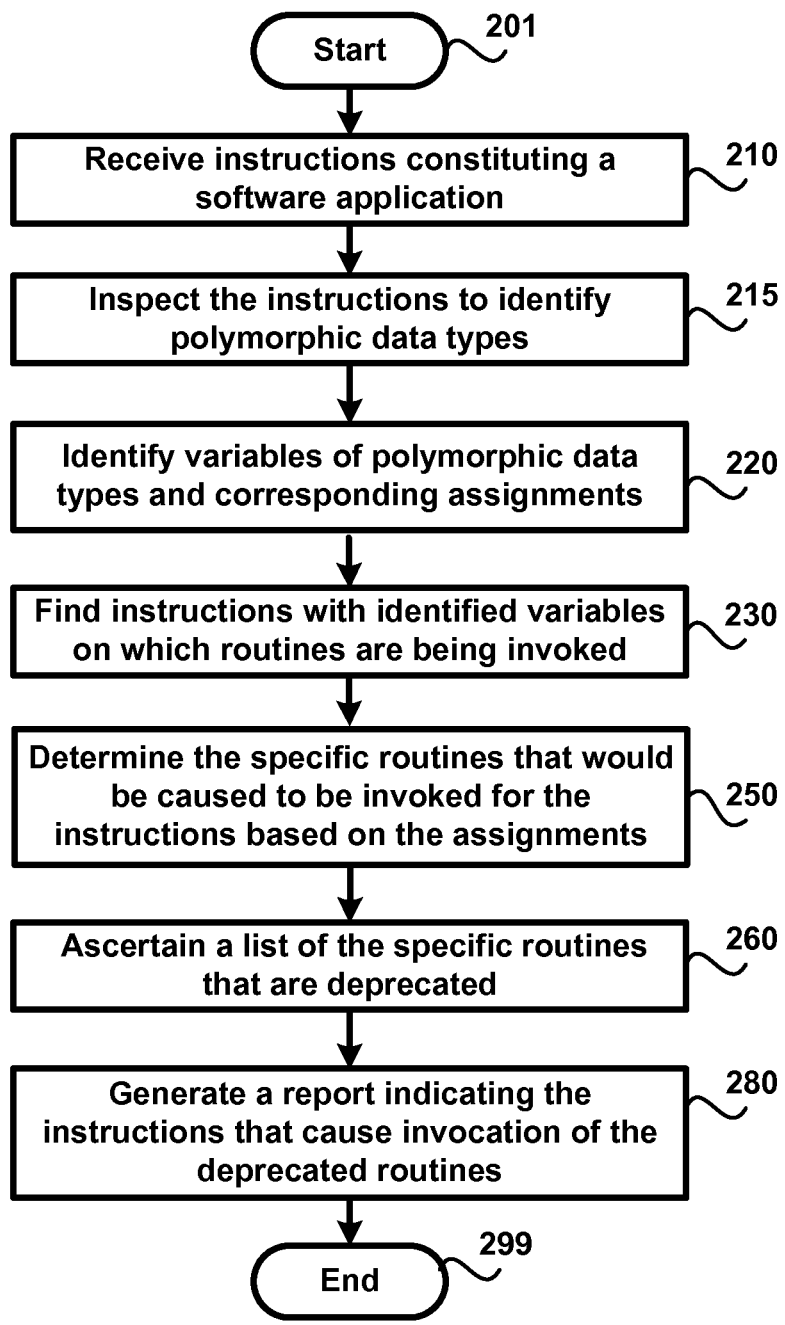
FIG. 2 is a flowchart illustrating the manner in which deprecated dynamically bound routines are identified in an example embodiment.

FIG. 2 is a flowchart illustrating the manner in which audit trail data is captured reliably, in an embodiment of the present invention. The flowchart is described with respect to FIG. 1 merely for illustration. However, many of the features can be implemented in other environments also without departing from the scope and spirit of several aspects of the present invention, as will be apparent to one skilled in the relevant arts by reading the disclosure provided herein. The flow chart begins in step 201, in which control immediately passes to step 210.

In step 210, analysis tool 155 receives instructions constituting software application 110 (i.e., the source code of software application 110). In general, the instructions are specified according to a pre-defined syntax and corresponding semantics of a programming language. It is assumed that software application 110 implements subtype polymorphism, i.e., has at least one set of polymorphic data types (one super-type and a corresponding multiple subtypes), according to such syntax/semantics.

In step 215, analysis tool 155 inspects the (received) instructions to identify polymorphic data types. In step 220, analysis tool 155 identifies variables of polymorphic data types and corresponding assignments. Analysis tool 155 may use a lexical parser to identify tokens in the software instructions, and thereafter determine whether specific constructs corresponding to the definition of polymorphic data types, variables and assignments are present, based on the tokens. In general, the tokens and the desired constructs (including data types, variables and assignments) are identified according to the syntax/semantics of the programming language.

In the disclosure herein, the term "variable" is used to refer to a token that can be associated with one or more values, such that any further usage of the variable refers to the associated value according to the semantics of the programming language. The term "assignment" refers to any construct in the programming language that causes (according to the semantics) a value to be associated with a variable. The term "data type" specified for a variable restricts the values that can be associated with the variable.

In step 230, analysis tool 155 finds instructions with identified variables on which routines are being invoked. Similar to in step 220, analysis tool 155 may find such instructions based on the syntax/semantics of the programming language.

In step 250, analysis tool 155 determines the specific routines that would be caused to be invoked for each of the (found) instructions based on the assignments. For each instruction, analysis tool 155 may first identify the specific polymorphic data type that the variable specified in the instruction is holding (pointing to or assigned to) based on the location (source file, line number, etc.) of the instruction (determined in step 230) and the assignments (determined in step 220).

Typically, the specific data type is the type of the value that is assigned in the last assignment (preceding the instruction) or a value that is passed as a parameter (of the method) in the execution flow (i.e., the sequence in which instructions would be executed) is determined. Analysis tool 155 then identifies the implementation of the routine defined in the specific data type (sub type or a super type) as being invoked. It may be noted that step 250 is performed for each of the instructions found in step 230 and accordingly the set of routines invoked by the software application is determined.

In step 260, analysis tool 155 ascertains a list of the specific routines that are deprecated. In one embodiment, database system 130 contains data indicating the specific external routines (implemented in software libraries 170) that are deprecated. Analysis tool 155 may accordingly check the data to determine the list of specific routines that are deprecated.

In step 280, analysis tool 155 generates a report indicating the instructions that cause invocation of the deprecated routines. The report may contain various other details identified in the above noted steps. The flow chart ends in step 299.

Thus, analysis tool 155 examines the software instructions (without having to execute the instructions) of a software application to provide a report of deprecated external routines invoked by a software application implementing subtype polymorphism. The approaches thus described can be used in conjunction with software applications written in various programming languages (e.g., C/C++, Java type programming languages, Python, etc.) by understanding the syntax and semantics of the corresponding language, as will be apparent to a skilled practitioner by reading the disclosure herein. The description is continued with respect to an example software application written in C/C++.

4. Software Application Implementing Subtype Polymorphism

FIG. 3 depicts the software instructions (shared by several user applications) in an example embodiment of software library 170, and FIG. 4 depicts an example embodiment of software application 110 (developed by a developer) having instructions which invoke routines provided by such a library externally, while implementing subtype polymorphism. The instructions in each figure, as relevant to an understanding of several aspects of the present invention, are described briefly below.

Broadly, according to semantics of C++ programming language, subtype polymorphism is specified at a routine level by having at least one virtual routine in a data type. A routine is syntactically specified to be virtual using the keyword 'virtual' in the routine definition. Thus, any data type having a virtual routine operates a super-type with corresponding classes implementing the virtual routine operating as sub-types. For further details on C++ in general, the reader is referred to a book entitled, "C++ Programming Language, $3^{rd}$ Edition", by Bjarne Stroustrup, ISBN-13: 978-0201889543.

It should be however appreciated that different conventions (syntax/semantics) can be used in other programming languages to specify polymorphic data types, without departing from the scope and spirit of several aspects of the present invention, as will be apparent to a skilled practitioner by reading the disclosure provided herein. For example, in Java programming type environments, keywords such as 'abstract', 'interface', and 'implements' are used to indicate the polymorphic data types. For further details on Java programming language in general, the reader is referred to a book entitled, "Core Java™ 2, Volume I-Fundamentals (7th Edition) (Core Series)" by Cay S. Horstmann and Gary Cornell, ISBN-13: 978-0131482029.

Referring to FIGS. 3, 4A and 4B, it may be appreciated that the software instructions of each Figure are provided in a corresponding file. The instructions of FIGS. 3, 4A and 4B are assumed to be in the files named planet.h, planets.h, and main.cpp respectively. The sequential numbers on the left hand side starting from 01 onwards, represent the corresponding line number in the file. The reference numbers on the right hand side are used to point to specific lines of code in the description herein.

Continuing with respect to FIG. 3, Satellite class starting at line 315 is an object type (contrasted with standard types such as integers, etc.), which operates as a super-type due to the presence of two virtual routines at lines 320 and 325. Lines 320 and 325 further show respective routines getMass( ) and getName( ) being defined using the 'virtual' keyword. The Planet (subtype) class is shown extended/derived from super-type class Satellite, using construct ":" at line 330.

Planet class is defined as being capable of operating as super-type to any other sub-type classes by virtue of a routine texturize( ) being defined as a virtual routine internal to the class at line 335. By setting the virtual routine '=0', the semantics of C++ require that the texture( ) be defined in corresponding subtypes. In the absence of such assignment to zero (e.g., at lines 320 and 325), the corresponding routine need not be implemented by the corresponding subtype classes, since a default implementation is specified (starting from lines 320 and 325).

Continuing with respect to FIG. 4A, line 405 indicates that the code of FIG. 3 (planet.h) is included in the present code. As shown at lines 410 and 420, Jupiter and Earth classes are defined as subtypes of Planet class (shown defined externally in FIG. 3). The implementation corresponding to routines texturize( ) getName( ) and getMass( ) are shown within subtype class Jupiter at lines 415, 425 and 435 respectively. The corresponding routines for texturize( ) and getName( ) are shown implemented differently for subtype class Earth starting at lines 440 and 445.

It may be appreciated that C++ programming language allows a variable (which may also be of reference or pointer type) of a super-type class (such as Satellite and Planet) to hold a value/object of either the super-type or any of the sub-types (Planet, Jupiter, Earth for Satellite super-type and Jupiter, Earth for Planet super-type). Accordingly the Satellite, Planet, Jupiter and Earth data types/classes can be viewed as polymorphic data types.

As noted in the Background section, it may be desirable to identify the specific routine that would be invoked during execution when a routine is invoked associated with a variable of a polymorphic data type. Analysis tool 155 provided according to several aspects of the present invention provides such information based on examination of the software instructions, as described above with respect to FIG. 2. The corresponding operation of analysis tool 155 will be clearer based on an understanding of the specific routines that would be invoked during execution. Accordingly, some example invocations associated with polymorphic data types and corresponding specific routines invoked, as illustrated below.

Now turning to FIG. 4B, line 450 indicates that the code of FIG. 4A (planets.h) is included in the present code. Line 460 depicts variable p being defined as a pointer to super-type class Planet. Accordingly, variable p may point to a value/object of type Planet, Jupiter and Earth. Line 465 shows variable p being assigned to point to (or hold) object of subtype Earth (value earth defined to be of subtype Earth at line 461).

It may be appreciated that line 465 is identified as an assignment based on the construct "=" according to the C/C++ programming language. However, alternative constructs such as a variable declaration, as a value passed for a parameter of a method invocation, etc. may also be identified as assignments, as will be apparent to one skilled in the relevant arts.

Line 470 thereafter shows invocation of render( ) routine in an object pointed to by variable p. By virtue of the assignment in line 465, the implementation of render( ) within the scope of object earth (of subtype Earth) is invoked. Since the implementation of render( ) routine is not found in subtype class Earth, the implementation of render( ) in super-type class Planet (around line 340 of FIG. 3) is invoked.

Due to such invocation of render( ) routine within the scope of super-type class Planet, the code portion starting at line 340 operates to invoke two routines—drawASphere( ) and texturize( ). The routine drawASphere( ) is shown implemented within the scope of super-type class Planet starting at line 337, and the corresponding software instructions are executed to draw a sphere (detail not shown).

On the other hand, texture( ) is not implemented within the scope of super-type class Planet, and due to the assignment at line 465, the corresponding implementation is searched for within the scope of subtype class Earth. Code portion starting at line 442 depicts paintBlue( ) routine being invoked within the implementation of texturize( ) routine and thus the sphere is possibly painted blue (detail not shown).

Thus, the invocation of render( ) routine in line 470 causes invocation (consequently execution) of render( ) and drawASphere( ) routines of Planet super-type, the texturize( ) and paintBlue( ) routines of Earth subtype. These four routines represent the specific routines that would be caused to be invoked in response to invocation of render( ) routine in line 470. It may be appreciated that drawASphere( ) routine is an externally implemented routine (in library 170 of FIG. 3), and accordingly it is required to be identified for verifying whether the routine is deprecated, as noted above in the background section.

It should be noted that assignment of some other data type prior to invocation, could cause other set of specific routines to be invoked, as illustrated below with the next example.

Accordingly at line 478, the invocation of render( ) routine associated with variable p would cause invocation of routines within the scope of object Jupiter, due to the assignment at line 475. Similar to logic described above, render( ) routine from line 340 onwards, texturize( ) routine of Jupiter subtype from line 415 onwards, and drawTheRings( ) routine (of Jupiter subtype) from line 420 onwards, would be executed in response to the invocation at line 478. As a result, the sphere corresponding to Jupiter is possibly painted with the rings (detail not shown).

Thus different invocations of the same routine (here, render( ) associated with the same variable (p) at lines 470 and 478 causes different sets of routines to be invoked (and consequently executed). This is in contrast to lines 472 (where render( ) is invoked associated with variable earth) and 479 (where render( ) is invoked associated with variable jupiter), where the set of routines can be pre-determined since the variables (earth and jupiter) are defined as being of the subtypes (Earth and Jupiter). Such pre-determination may be performed in the natural course of compilation.

Additional invocations illustrating subtype polymorphism are shown within code portion starting at line 480, corresponding to the implementation of routine another_set( ). At line 481, variable earth2 is shown defined as (and thus holds) an object of super-type Satellite class.

In line 482, getMass( ) and getName( ) routines are shown invoked corresponding to the variable earth2 (of Satellite data type) and would cause invocation of the corresponding implementations shown starting at lines 320 and 325 of FIG. 3 respectively. It may be appreciated that these implementations represent external routines (as being part of library 170 of FIG. 3) and may accordingly need to be identified.

In line 483, variable earth3 is defined as a pointer to super-type Satellite, and assigned to object of subtype class Earth. When the getMass( ) is invoked using variable earth3 in line 484, due to the absence of corresponding implementation in subtype class Earth, the implementation of the code starting at line 320 within the scope of super-type class Satellite is executed. On the other hand, the instructions corresponding to code portion starting at line 445 are executed for getName( ) (in view of the corresponding implementation provided within the scope of subtype Earth), also invoked in line 484.

Lines 485 and 486 operate to invoke corresponding routines of Satellite super-type, though variable is indicated to be earth3, and the description is not provided for conciseness. The operation due to lines 487-494 is similarly described, except that the operation is with respect to subtype class Jupiter (which is shown implementing both routines starting lines 435 and 425 respectively).

It should be appreciated that software application 110 in conjunction with library 170 operates as described above (for illustrating subtype polymorphism in corresponding contexts) with respect to FIGS. 3 and 4, when executed in server system 160. However, as noted above, analysis tool 155 operates on mere examination (without execution) of the software instructions constituting software application 110.

The operation of analysis tool 155 in one embodiment, with respect to the code portions shown in FIGS. 3 and 4, is described below in further detail. As may be readily observed from the description, analysis tool 155 operates to examine (without execution) the software instructions to determine the execution flow as per the programming logic specified in the software instructions, and then identify the specific routines that would be invoked in such a flow at the corresponding points of invocation.

5. Analysis Tool

In one embodiment, analysis tool 155 is implemented to analyze the software instructions in three passes. Each pass represents one examination of the software instructions, and thus the instructions may be retrieved into a random access memory (RAM) once for each pass. Multiple passes are shown employed to operate with input files (having instructions for corresponding modules/classes, etc.) and/or definitions, provided in any arbitrary order. However, alternative embodiments can be employed with fewer or more passes, without departing from the scope and spirit of several aspects of the present invention.

The software instructions may be first processed in a pre-processing stage via a tokenizer (Lexer), which provides a stream of tokens while recording information such as file name, line numbers, position of the beginning character, etc. All whitespaces may be ignored/stripped in the output. The tokenization of the software instructions is performed according to the syntax of the C/C++ programming language, and the resulting tokens are provided as an input to the first pass of analysis tool 155.

It may be appreciated that for other programming languages (such as Java, Python, etc.), the Lexer may need to be suitably modified according to the syntax of the programming language (in which software application is written). Further processing of the stream of tokens may be performed agnostic of the programming languages, as will be apparent to one skilled in the art by reading the disclosure herein.

Broadly, the first pass operates to identify all user-defined data types/classes, and also super-types defined in the libraries. In addition, the details of the routines defined and/or implemented in each data type and C functions, are also identified in the first pass. Thereafter, in the second pass, along with the variable of the various data types (in particular super-type), the assignments made to each variable, are identified (as noted in step 220 above). In addition, the calling dependencies among the routines are also identified. Finally, in the third pass, the steps of 230, 250, and 260 are performed for each occurrence of a routine invocation associated with a identified variable to ascertain the externally invoked deprecated routines. A report is finally generated for such deprecated routines. The outputs corresponding to each pass are briefly described below.

6. First Pass

FIGS. 6A-6C together depicts the output of the first pass of analysis tool 155. Table 600 of FIG. 6A depicts some of the class definitions identified by examination of the instructions of FIGS. 3 and 4. Each of the rows 621-624 corresponds to one of the identified classes. Columns 611-618 contain the identified details for each class. Some of such identified details include Class Name 611 (unique identifier of the class), Ancestor List 612 (the ancestor class sequence from which the class is extended), File Name 613 (where the class is defined), is TemplateClass 615 (set to True to indicate that the class is a template class, and to false otherwise), Package Name 615 (includes the library and name space), is Red flag 616 (described below with respect to FIG. 5), Subclassing Qualifiers 617 (indicating whether the extension from the ancestor of 612 is public, private or protected), variable list 618 (specifying the details of the variables that are defined within the class). Other details such as namespace (not shown here for conciseness) may also be identified.

For each of the routines of a class, additional details are collected, as shown in FIG. 6B. Each of the rows 651-661 of table 630 there corresponds to a single routine. Table 630 is shown containing Class Name 641 (the class in which the routine is found), Routine Name 642, Virtual flag 643 (set to Yes if defined to be virtual, or else No), argument count 644 (number of arguments to the routine as inputs), implementation found flag 645 (True if found within the class, or else False), qualifiers 646 (whether routine is accessible to external classes or not), special flag 647 (true if routine is constructor, destructor or copy constructor, or false otherwise), is Red flag 648 (described below), variable list 649 (specifying the details of the variables defined within the routine).

Along with gathering the details of classes and routines, analysis tool 155 may check whether any of the classes and/or routines are deprecated by examining the information in database system 130. The content of database system 130 in one embodiment is depicted in FIG. 5. As shown there, each of the rows 541-542 corresponds to one routine (column 523), identified with respect to package name (library name) 521 and class 522 in which the routine is defined. Columns 524-526 respectively indicate severity, fixes and suggestions for the corresponding row. An entry of a row indicates that the corresponding routine is deprecated. Thus, the table indicates that routines drawASphere (of Planet class) and getName (of Satellite class) are deprecated.

Continuing with the operation in the first pass, analysis tool 155 marks each of the rows in column 616 and 648, based on the information in table 500 of FIG. 5. Accordingly, is Red 616 is marked as true for rows 621 and 622, indicating that the corresponding classes Planet and Satellite have at least one deprecated routine. Column 648 of FIG. 6B indicates the specific routines that are indicated to be deprecated in table 500. Thus, rows 652 and 654 have is Red flag 648 marked to true corresponding to rows 542 and 541 respectively.

The details of C type routines identified during the first pass, are stored in FIG. 6C. Each of rows 691-692 corresponds to a single C-type routine and columns 681-685 respectively indicate the function/routine name, number of arguments, return type and the starting location (file name and line number in the file) for the definition of the routine. Such details of C type functions may facilitate identification of template classes.

6. Second Pass

As noted above, in the second pass, analysis tool 155 identifies the variables defined in the software application, based on the user defined data types/super-types determined in the first pass and a set of standard C++ data types (stored in a table similar to table 600, not shown). If a variable is specified as being part of a class/data type or a routine of a data type, the name and data type of the variable is respectively added to variable list 618 of the row corresponding to the class in table 600 or to variable list 649 of the row corresponding to the routine in table 630. Variables that do not fall within class definitions are stored independently as described below. In addition, the second pass attempts to collect as much information as possible about the method and function calls made in the current context.

Table 700 of FIG. 7A depicts some of the variables (not part of a class definition) identified by examination of the instructions of FIGS. 3 and 4. Each of the rows 741-747 corresponds to one of the identified variables. Columns 721-724 contain the identified details for each variable. Some of such identified details include Name 721, scope 722, the defined data type 723, qualifiers 724 (indicating the scope modifiers of the variable such as static, const, volatile, mutable, extern, etc.) and assignment list 725 (specifying the details of the assignments made to the corresponding variable).

The assignments made to each variable may be identified based on the assignment operation (denoted by the keyword "=") specified by the C++ programming language. Analysis tool 155 may accordingly for a specific variable, identify the occurrences of the assignment operation where the specified variable is specified on the left hand side of the keyword and include such occurrences as corresponding entries in the assignment list (column 725) of the specific variable. Each entry in the assignment list is in the form of a triplet containing three values—a line number (at which the assignment is made in the file), a resolved flag (set to true if the data type can be determined, or to false otherwise) and an assigned data type (indicating the data type of the value/object held by the variable after the assignment).

The values of resolved flag and assigned data type for each assignment entry may be determined based on the right hand side of the assignment operation. For example, if the right hand side is a variable, the data type of the variable is determined to be the assigned data type, and the resolved flag is set to true. If the right hand side is an expression or a routine call, an attempt is made to determine the return type of the expression or routine call. If the return type can be determined, the return type is set as the assigned data type and the resolved flag is set to true. On the other hand, if the return type of the routine or overall type of the expression cannot be determined (for example, due to information not yet available, non-examination of the relevant files, return type is a pointer necessitating further analysis, etc.), the resolved flag is set to false. Such unresolved assignments may be resolved during the third pass (for example, at the beginning of the third pass).

Furthermore, in a scenario the return type is of super-type (or a pointer thereof) and the routine in turn invokes other routines, analysis tool 155 follows the chain till the point it is able to ascertain the true return type. In following the chain of called routines, if analysis tool 155 reaches a point where it cannot successfully resolve the type returned, the resolved flag is set to false and further attempts to resolve the assigned data type is performed during the third pass.

In addition to the above noted identification of variables, analysis tool 155 also determining the calling dependencies among the routines identified during the first pass. In particular, the instructions of each routine of table 630 is examined to determine the corresponding list of routines invoked/called by the routine, and such information is updated in the table. Table 630 of FIG. 7B depicts some of the routines (rows 655, 657 and 661) updated with such information. Called List740 specifies a list of routines called/invoked by the corresponding routine. Each entry in the list indicates the name of the invoked routine, the file name and the corresponding line number at which the routine is invoked. In a scenario that the method or function invocation takes parameters/arguments, the correct types of these parameters is stored along with the called list in table 630 of FIG. 7B. The types of the parameters may be determined similar to the determination of the types of the variables as described above with respect to table 700 of FIG. 7A.

Though not shown, additional information such as the details/data type of the arguments and the return type of each routine (both C++ type shown in table 630 and C type shown in table 670) may also be identified and the corresponding rows in the tables may be accordingly updated. Such information ensures that variables' types are correctly identified for global, static, local or actual parameters. Accordingly during the first and second pass, analysis tool 155 determines all the information required for identifying the specific routines invoked corresponding to invocation of routines associated with variables of polymorphic data types. Such identification of specific routines is performed during a third pass as described below with examples.

7. Third Pass

During the third pass, analysis tool 155 first finds instructions that have invocations of routines associated with the variables identified in the second pass. In C++ programming language, such invocation may be of the form "variable.routine( )" when the variable is defined as capable of holding a data type or a reference type and also of the form "variable->routine( )" when the variable is defined as a pointer to a data type.

Thus, analysis tool 155 finds that there are such invocations in the software instructions of FIGS. 3 and 4A, and the first occurrence of such an invocation associated with a variable occurs in line number 12 of the instructions shown in FIG. 4B, where render( ) routine is invoked on a variable p (the -> indicating that p is a pointer).

Analysis tool 155 first identifies the data type of variable p as being a pointer to data type Planet based on the value in column 723 of row 741 (the * there further confirming that the variable is a pointer). The assignment list corresponding row 741 is then checked to determine the last assignment prior to the invocation. Thus, the list of assignments in column 725 of row 741 is checked to identify that the assignment entry <11, true, Earth> is the last assignment prior to the invocation (since line number 11 is just prior to line number 12). The variable p is accordingly identified to be pointing to an Earth data type value.

The routine information (in particular, rows 653-655) of table 630 is then checked to identify whether the definition of Planet data type includes a render( ) routine. The render( ) routine is accordingly determined to be defined in Planet data type (row 655) as a non-virtual routine (based on value "No" in column 643 in row 655). The render( ) routine is accordingly determined to be one of the specific routine invoked, and also that the routine is not deprecated (value False in column 648 in row 655).

The called list of routines is then identified based on the value 740 of row 655 as including drawASphere and texturize. The details of each of these routines in rows 653 and 654) is then checked to determine whether any of these routines are deprecated. As such, the drawASphere routine is identified as being deprecated (value True in column 648 of row 654), and accordingly the instruction of line 12 of FIG. 4B is marked as causing invocation of a deprecated routine.

With respect to the texturize( ) routine, analysis tool 155 identifies that the routine is a virtual routine having no implementation in the Planet data type (based on values "yes" and "False" in columns 643 and 644 of row 653). Accordingly, analysis tool 155 inspects the last assigned data type Earth for an implementation of the texturize( ) routine. On determining that such an implementation is present in the Earth data type (row 661), the called list of texturize( ) routine (in column 740 of row 661) is retrieved and the above noted process is repeated for the routines (such as paintBlue) specified there.

It may be appreciated that in a scenario that the assigned data type (Earth in the above example) does not have an implementation of a virtual routine (such as texturize), ancestors of the Earth may be searched for such an implementation, until an implementation is found in one of the ancestors. Such an implementation is then identified as the specific routine that is invoked in response to the invocation (of render) specified in the found instruction (of line 12).

It may be further appreciated that C++ programming language allows multiple inheritance, where a subtype may be specified as extending from multiple super-types. For example, an additional data type such as Star may be specified as extending from Satellite, and a data type Sun may be specified as extending both Planet and Star. In such a scenario, the specific routine invoked may be determined by searching the ancestors using a depth first search (DFS) technique (well known in the arts as related to searching of tree data structures).

Thus, for any routine invocation of the form "variable->routine( )", analysis tool 155 first determines whether the defined data type includes an implementation of the invoked routine and/or then determines whether the last assigned data type (or an ancestor) includes the implementation may of the routine. The manner in which routine invocation of the form "variable.routine( )" is analyzed by analysis tool 155 is described in detail below.

After performing above noted analysis for line 12 of FIG. 4B (and concluding that the instruction of line 12 causes invocation of a deprecated routine), analysis tool 155 then finds the next invocation in line number 13 of FIG. 4B, where render( ) routine is invoked on a variable earth.

Analysis tool 155 then identifies the data type of variable earth as being of an Earth data type (column 723 of row 742). The routine information (in particular, rows 660-661) of table 630 is then checked to identify whether the definition of Earth data type includes a render( ) routine. Since such a routine is not found (in rows 660-661), the class definition of Earth in row 624 is checked to determine the ancestors of Earth data type (n column 612). On determining that Planet data type is an ancestor of Earth data type, the routine information of table 630 is again inspected to determine whether the render( ) routine exists in the Planet data type.

The above noted analysis of the render( ) routine in Planet data type is again performed and the invocation of line 13 is also identified as causing execution of a deprecated external (since drawASphere is in library 170 of FIG. 3) routine. Similarly, the invocations of render( ) routine in lines 16 and 17 are also identified as causing invocation of deprecated routines, though the above noted analysis is performed using the assigned data type as Jupiter instead of Earth.

Thus, the deprecated routine drawASphere( ) of the Planet super-type is identified as being invoked at lines 12, 13 and 16 and 17 of FIG. 4B (corresponding to file main.cpp). A similar analysis of the invocations in the another_set( ) function of lines 21-35 may be performed and the invocations of get-Name( ) in lines 23, 27 and 32 may be identified as invoking the deprecated getName( ) implementation in the Satellite data type. For example, in line 23, the getName( ) routine is identified as being invoked on the variable earth2 of data type Satellite (row 744), and that getName( ) routine defined in the Satellite class (row 652) is marked as deprecated.

However, in line 25, the getName( ) routine is identified as being invoked on the variable earth3 of data type Satellite* (row 744), but currently holding the data type Earth (based on the assignment in line 24 as indicated in the assignment list of row 744). In response to identifying that the getName( ) routine is defined as a virtual routine in Satellite data type (row 652, column 643), the routines in the Earth data type (rows 660-662) are checked to identify that a getName( ) implementation is present in the Earth data type (row 662), and accordingly the implementation is identified as being invoked. Since the implementation of getName( ) in row 662 is not marked as deprecated (value False in column 648), the invocation in line 25 is not added to the report (described below).

Thus, during the third pass, analysis tool 155 identifies all the instructions in the software application that may cause invocation of deprecated external routines. Analysis tool 155 then generates a report indicating such identified instructions as described below with examples.

8. Report Generation

Figure 8:
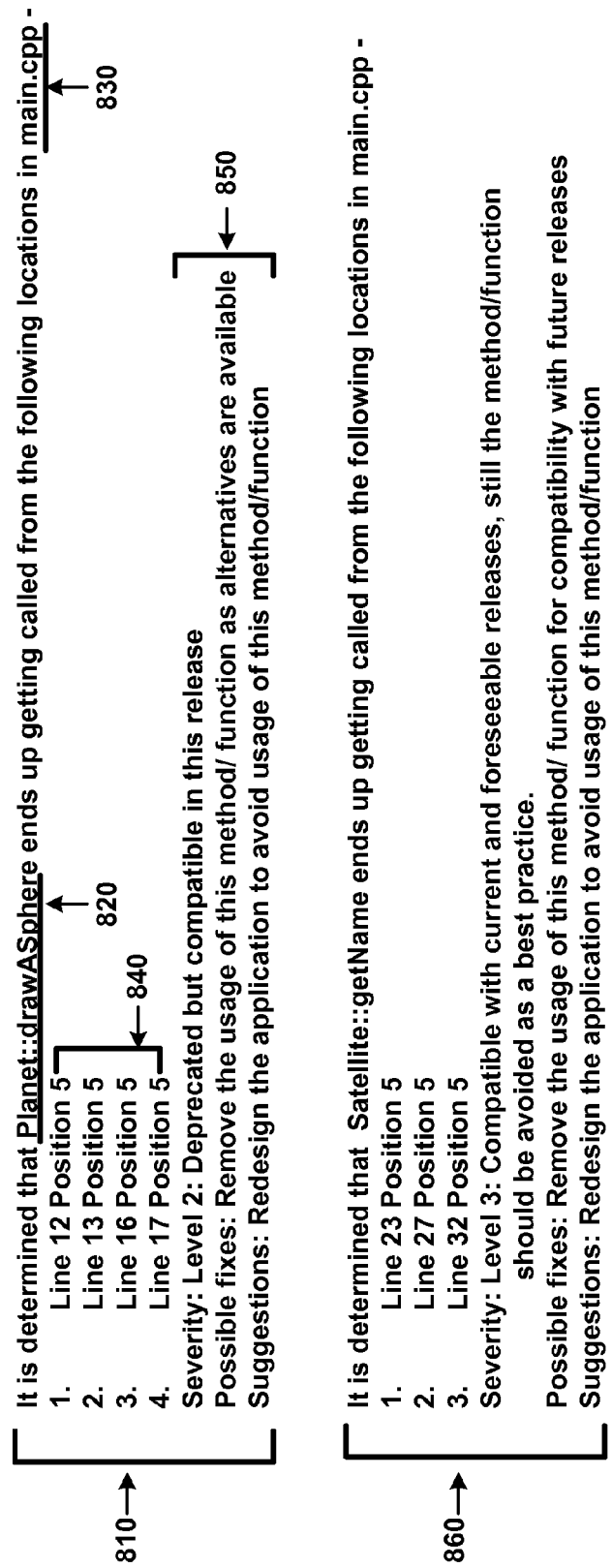
FIG. 8 depicts a sample report generated after a third pass of examination of instructions constituting the software application of FIG. 4 in one embodiment.

FIG. 8 depicts a sample report generated after a third pass of examination of instructions constituting the software application of FIG. 4 in one embodiment. The report is generated by analysis tool 155 after identification of the instructions causing invocation of deprecated routines specified in table 500 of FIG. 5.

Thus, each of data portions 810 and 860 respectively identifies the instructions that cause invocation of the deprecated routines specified in rows 541 and 542 of FIG. 5. In particular, data portion 810 indicates that the deprecated routine drawASphere in Planet data type (as indicated by text 820) corresponding to row 541 is caused to be invoked in the lines 12, 13, 16 and 17 (as indicated by 840) in the main.cpp file (as indicated by text 830. The position noted in 840 corresponds to the character position in the line at which the invocation is specified, and may be stored along with the line number in the data of FIGS. 6A-7B.

Data portion 850 indicates the severity, possible fixes and suggestions corresponding to the invocation of the deprecated routine drawASphere based on the information stored in columns 524-526 in row 541. Data portion 860 similarly indicates the instructions (23, 27 and 32 in main.cpp file) that cause invocation of the deprecated routine getName( ) in the Satellite data type (corresponding to row 542 of FIG. 5). The respective severity, possible fixes and suggestions from table 500 is also shown included in data portion 860.

It may be appreciated that analysis tool 155 may be used for performing the three pass analysis even for software applications that do not implement subtype polymorphism. In such a scenario, analysis tool 155 may identify and report only the C style deprecated routines.

It should be further appreciated that the features described above can be implemented in various embodiments as a desired combination of one or more of hardware, executable modules, and firmware. The description is continued with respect to an embodiment in which various features are operative when the executable modules described above are executed.

9. Digital Processing System

Figure 9:
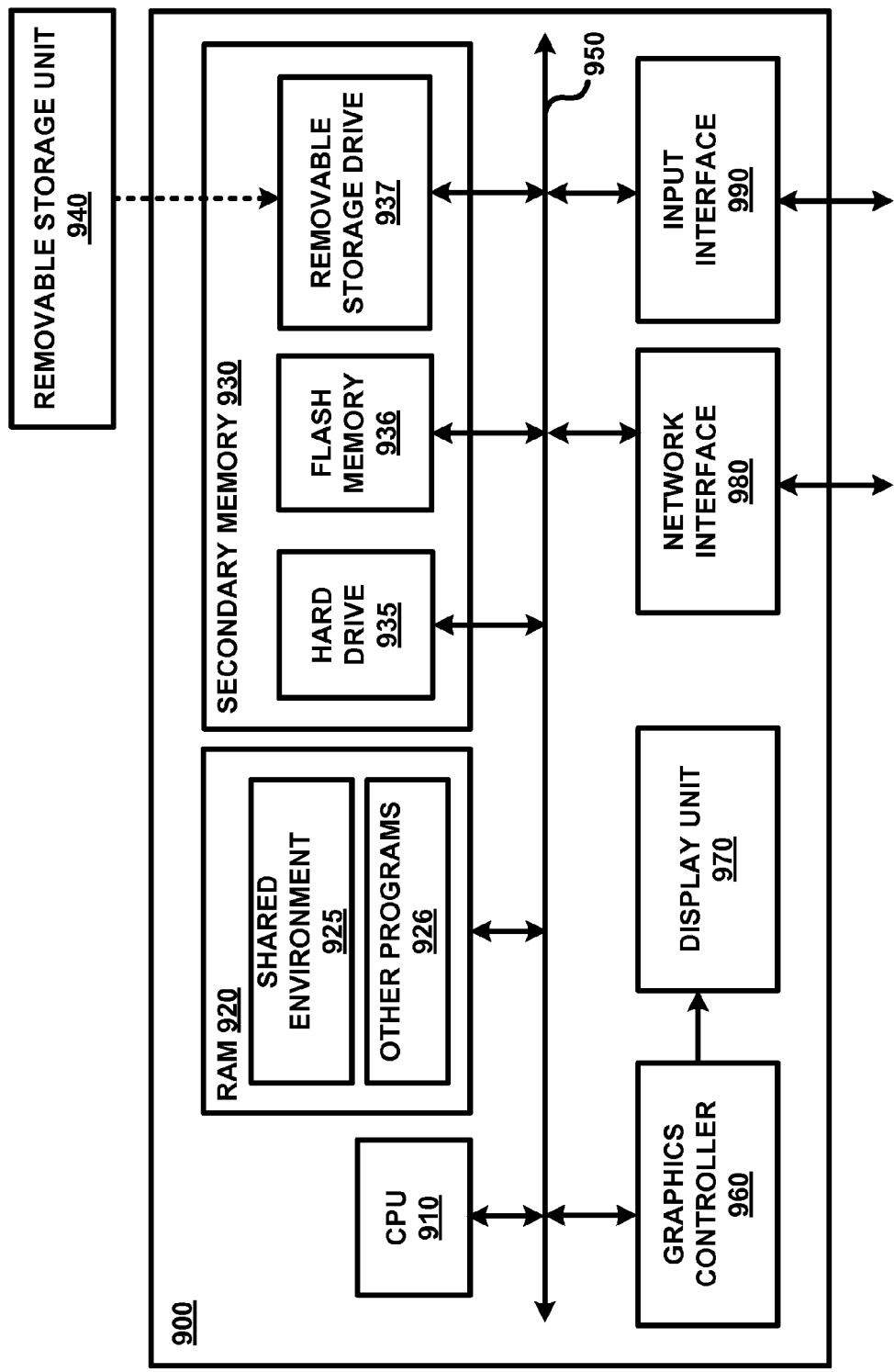
FIG. 9 is a block diagram illustrating the details of a digital processing system in which several aspects of the present invention are operative by execution of appropriate software instructions.

FIG. 9 is a block diagram illustrating the details of digital processing system 900 in which various aspects of the present invention are operative by execution of appropriate executable modules. Digital processing system 900 may correspond to developer system 150.

Digital processing system 900 may contain one or more processors (such as a central processing unit (CPU) 910), random access memory (RAM) 920, secondary memory 930, graphics controller 960, display unit 970, network interface 980, and input/output interface 990. All the components except display unit 970 may communicate with each other over communication path 950, which may contain several buses as is well known in the relevant arts.

CPU 910 may execute instructions stored in RAM 920 (which also includes RAM 145) to provide several features of the present invention. CPU 910 may contain multiple processing units, with each processing unit potentially being designed for a specific task. Alternatively, CPU 910 may contain only a single general-purpose processing unit.

RAM 920 may receive instructions from secondary memory 930 using communication path 950. RAM 920 is shown currently containing software instructions constituting shared environment 925 and/or user programs 926 (which include software application 110, compiler 180, etc.). Shared environment 925 contains utilities shared by user programs, and such shared utilities include operating system, virtual machines, device drivers, etc., which provide a (common) run-time environment for execution of user programs/applications.

Graphics controller 960 generates display signals (e.g., in RGB format) to display unit 970 based on data/instructions received from CPU 910. Display unit 970 contains a display screen to display the images defined by the display signals. Input/output interface 990 includes input as well as output devices to enable a user to interact with system 900, and thus provides the basis for user interface 390 as well. Network interface 980 corresponds to network interface 360.

Secondary memory 930 (representing a non-transitory storage/medium) may contain hard drive 935, flash memory 936, and removable storage drive 937. Secondary memory 930 may store data (e.g., portions of the software code shown in FIGS. 4A-4B, portions of the data shown in FIGS. 5, 6A-6C and 7A-7B) and software instructions (for example, for performing the steps of FIG. 2), which enable digital processing system 900 to provide several features in accordance with the present invention.

Some or all of the data and instructions may be provided on removable storage unit 940, and the data and instructions may be read and provided by removable storage drive 937 to CPU 910. Floppy drive, magnetic tape drive, CD-ROM drive, DVD Drive, Flash memory, removable memory chip (PCMCIA Card, EPROM) are examples of such removable storage drive 937.

Removable storage unit 940 may be implemented using medium and storage format compatible with removable storage drive 937 such that removable storage drive 937 can read the data and instructions. Thus, removable storage unit 940 includes a computer readable storage medium having stored therein computer software and/or data. However, the computer (or machine, in general) readable storage medium can be in other forms (e.g., non-removable, random access, etc.).

In this document, the term "computer program product" is used to generally refer to secondary memory 930. These computer program products are means for providing software to digital processing system 900. CPU 910 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

10. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A computer-implemented method of identifying deprecated routines invoked by a software application implementing subtype polymorphism, said method comprising:

receiving a source code corresponding to software instructions constituting said software application, said source code corresponding to said software instructions comprising definitions of a plurality of object types;

maintaining a database indicating a second plurality of routines as being deprecated;

identifying, by examining said source code, a set of polymorphic data types of said plurality of object types such that a variable defined as being one of said set of polymorphic data types can be assigned an object instance of any of said set of polymorphic data types, wherein invocation of a routine associated with said variable causes invocation of an invoked routine present in one of said set of polymorphic data types based on the polymorphic data type assigned to said variable at a point of invocation of said routine;

finding, by examining said source code, a first instruction containing an invocation of a first routine associated with a first variable, said first variable being defined as of a first polymorphic data type of said set of polymorphic data types;

determining, a first invoked routine that would be caused to be invoked for the invocation specified in said first instruction, wherein said determining comprises identifying by examining said source code, an assignment specifying that said first variable is assigned a second object instance of a second polymorphic data type of said set of polymorphic data types prior to said first instruction according to execution flow of said software instructions, wherein said first invoked routine is determined to be said first routine specified in said second polymorphic data type based on said assignment;

ascertaining whether said first invoked routine is deprecated, wherein said ascertaining includes said first invoked routine in said report only if said first invoked routine is contained in said second plurality of routines; and generating a report indicating the instructions causing invocation of deprecated routines, wherein said report indicates that said first instruction causes invocation of said first invoked routine if said first invoked routine is ascertained to be deprecated, wherein said identifying said set of polymorphic data types, said finding said first instruction and said identifying said assignment are performed by examination of said source code, without having to execute said source code.

2. The method of claim 1, wherein said maintaining also maintains in said database for each of said second plurality of routines, a corresponding severity, a corresponding set of possible fixes and a corresponding set of suggestions, wherein said generating further includes said corresponding severity, said corresponding set of possible fixes and said corresponding set of suggestions for each of said deprecated routines in said report.

3. The method of claim 1, if said first routine is not found in said second polymorphic data type, said determining further comprising searching said set of polymorphic data types that are ancestors to said second polymorphic data type, wherein said searching identifies a second routine specified in a third polymorphic data type of said set of polymorphic data types to be said first invoked routine corresponding to said first instruction.

4. The method of claim 1, wherein said identifying also identifies a plurality of variables of said set of polymorphic data types and a corresponding set of assignments for each of said plurality of variables, wherein said finding finds a first set of instructions with each instruction containing an invocation of a corresponding routine associated with one of said plurality of variables, said plurality of variables containing said first variable, said corresponding set of assignments containing said assignment and said first set of instructions containing said first instruction, wherein said identifying and said finding are performed during multiple passes, each pass representing an independent examination of said source code, wherein said identifying of said set of polymorphic data types is performed during a first pass of examination of said source code, said identifying of said plurality of variables and said corresponding set of assignments is performed during a second pass of examination of said source code, and said finding of said first set of instructions is performed during a third pass of examination of said source code.

5. The method of claim 4, wherein said identifying generates as an output of said first pass, a first data set indicating the ancestors of each of said set of polymorphic data types, wherein said searching identifies said second routine and said third polymorphic data type based on said output of said first pass.

6. The method of claim 1, wherein said software instructions constituting said software application are specified according to an object oriented programming language, wherein each of said plurality of object types and each of said set of polymorphic data types is a class according to said object oriented programming language, wherein said identifying and said finding are performed according to the syntax and semantics of said object oriented programming language.

7. The method of claim 1, wherein said set of polymorphic data types contains a super type and a hierarchy of subtypes under said super type such that a variable defined as said super type can be assigned an object instance of any of said set of sub types, wherein said finding finds that said first polymorphic data type is said super type, wherein said determining identifies said second polymorphic data type to be one of said set of subtypes.

8. A non-transitory machine readable medium storing one or more sequences of instructions for causing a system to identify deprecated routines invoked by a software application implementing subtype polymorphism, wherein execution of said one or more sequences of instructions by said one or more processors contained in said system causes said system to perform the actions of:

receiving a source code corresponding to software instructions constituting said software application, said a source code corresponding to said software instructions comprising definitions of a plurality of object types;

identifying, by examining said source code, a set of polymorphic data types of said plurality of object types such that a variable defined as being one of said set of polymorphic data types can be assigned an object instance of any of said set of polymorphic data types, wherein invocation of a routine associated with said variable causes invocation of an invoked routine present in one of said set of polymorphic data types based on the polymorphic data type assigned to said variable at a point of invocation of said routine;

finding, by examining said sour code, a first instruction containing an invocation of a first routine associated with a first variable, said first variable being defined as of a first polymorphic data type of said set of polymorphic data types;

determining, a first invoked routine that would be caused to be invoked for the invocation specified in said first instruction, wherein said determining comprises identifying by examining said source code, an assignment specifying that said first variable is assigned a second object instance of a second polymorphic data type of said set of polymorphic data types prior to said first instruction according to execution flow of said software instructions, wherein said first invoked routine is determined to be said first routine specified in said second polymorphic data type based on said assignment;

ascertaining whether said first invoked routine is deprecated by interfacing with a database which maintains information indicating that a second plurality of routines are deprecated, wherein said ascertaining includes said first invoked routine is said report only if said first invoked routine is contained in said second plurality of routines; and generating a report indicating the instructions causing invocation of deprecated routines, wherein said report indicates that said first instruction causes invocation of said first invoked routine if said first invoked routine is ascertained to be deprecated, wherein said identifying said set of polymorphic data types, said finding said first instruction and said identifying said assignment are performed by examination of said source code, without having to execute said source code.

9. The non-transitory machine readable medium of claim 8, wherein database maintains for each of said second plurality of routines, a corresponding severity, a corresponding set of possible fixes and a corresponding set of suggestions, wherein said generating further includes said corresponding severity, said corresponding set of possible fixes and said corresponding set of suggestions for each of said deprecated routines in said report.

10. The non-transitory machine readable medium of claim 8, if said first routine is not found in said second polymorphic data type, said determining further comprising searching said set of polymorphic data types that are ancestors to said second polymorphic data type, wherein said searching identifies a second routine specified in a third polymorphic data type of said set of polymorphic data types to be said first invoked routine corresponding to said first instruction.

11. The non-transitory machine readable medium of claim 8, wherein said software instructions constituting said software application are specified according to an object oriented programming language, wherein each of said plurality of object types and each of said set of polymorphic data types is a class according to said object oriented programming language, wherein said identifying and said finding are performed according to the syntax and semantics of said object oriented programming language.

12. The machine readable medium of claim 8, wherein said set of polymorphic data types contains a super type and a hierarchy of subtypes under said super type such that a variable defined as said super type can be assigned an object instance of any of said set of sub types, wherein said finding finds that said first polymorphic data type is said super type, wherein said determining identifies said second polymorphic data type to be one of said set of subtypes.

13. A digital processing system comprising:
a processor;
a random access memory (RAM);
a machine readable medium to store a first plurality of instructions and a second plurality of instructions, wherein said first plurality of instructions constitutes a software application implementing subtype polymorphism, said first plurality of instructions being in the form of a source code, said first plurality of instructions comprising definitions of a plurality of object types, wherein said second plurality of instructions when retrieved into said RAM and executed by said processor forms an analysis tool designed to identify deprecated routines invoked by said software application, said analysis tool performing the actions of:
identifying, by examining said source code, a set of polymorphic data types of said plurality of object types such that a variable defined as being one of said set of polymorphic data types can be assigned an object instance of any of said set of polymorphic data types, wherein invocation of a routine associated with said variable causes invocation of an invoked routine present in one of said set of polymorphic data types based on the polymorphic data type assigned to said variable at a point of invocation of said routine;

finding, by examining said source code, a first instruction containing an invocation of a first routine associated with a first variable, said first variable being defined as of a first polymorphic data type of said set of polymorphic data types;

determining, a first invoked routine that would be caused to be invoked for the invocation specified in said first instruction, wherein said determining comprises identifying by examining said source code, an assignment specifying that said first variable is assigned a second object instance of a second polymorphic data type of said set of polymorphic data types prior to said first instruction according to execution flow of said software instructions, wherein said first invoked routine is determined to be said first routine specified in said second polymorphic data type based on said assignment;

ascertaining whether said first invoked routine is deprecated by interfacing with a database which maintains information indicating that a second plurality of routines are deprecated, wherein said ascertaining includes said first invoked routine in said report only if said first invoked routine is contained in said second plurality of routines; and generating a report indicating the instructions causing invocation of deprecated routines, wherein said report indicates that said first instruction causes invocation of said first invoked routine if said first invoked routine is ascertained to be deprecated, wherein said identifying said set of polymorphic data types, said finding said first instruction and said identifying said assignment are performed by examination of said source code, without having to execute said source code.

14. The digital processing system of claim 13, wherein said database also maintains for each of said second plurality of routines, a corresponding severity, a corresponding set of possible fixes and a corresponding set of suggestions, wherein said generating further includes said corresponding severity, said corresponding set of possible fixes and said corresponding set of suggestions for each of said deprecated routines in said report.

15. The digital processing system of claim 13, if said first routine is not found in said second polymorphic data type, said determining further comprising searching said set of polymorphic data types that are ancestors to said second polymorphic data type, wherein said searching identifies a second routine specified in a third polymorphic data type of said set of polymorphic data types to be said first invoked routine corresponding to said first instruction.

16. The digital processing system of claim 13, wherein said software instructions constituting said software application are specified according to an object oriented programming language, wherein each of said plurality of object types and each of said set of polymorphic data types is a class according to said object oriented programming language, wherein said identifying and said finding are performed according to the syntax and semantics of said object oriented programming language.

17. The digital processing system of claim 13, wherein said set of polymorphic data types contains a super type and a hierarchy of subtypes under said super type such that a variable defined as said super type can be assigned an object instance of any of said set of sub types, wherein said finding finds that said first polymorphic data type is said super type, wherein said determining identifies said second polymorphic data type to be one of said set of subtypes.

\* \* \* \* \*

UNITED STATES PATENT AND TRADEMARK OFFICE
CERTIFICATE OF CORRECTION

| | | |
|---|---|---|
| PATENT NO. | : 8,935,663 B2 | Page 1 of 1 |
| APPLICATION NO. | : 13/426605 | |
| DATED | : January 13, 2015 | |
| INVENTOR(S) | : Tiwari | |

It is certified that error appears in the above-identified patent and that said Letters Patent is hereby corrected as shown below:

In the Claims,

In column 19, line 16, In Claim 9, after "wherein" insert -- said --.

Signed and Sealed this
First Day of September, 2015

Michelle K. Lee
*Director of the United States Patent and Trademark Office*